May 14, 1940.  W. M. COOK  2,200,489

GRINDING AND SEPARATING APPARATUS

Filed June 14, 1937   2 Sheets-Sheet 1

Inventor.
Walter M. Cook
By
Barnett & Truman
Attorneys.

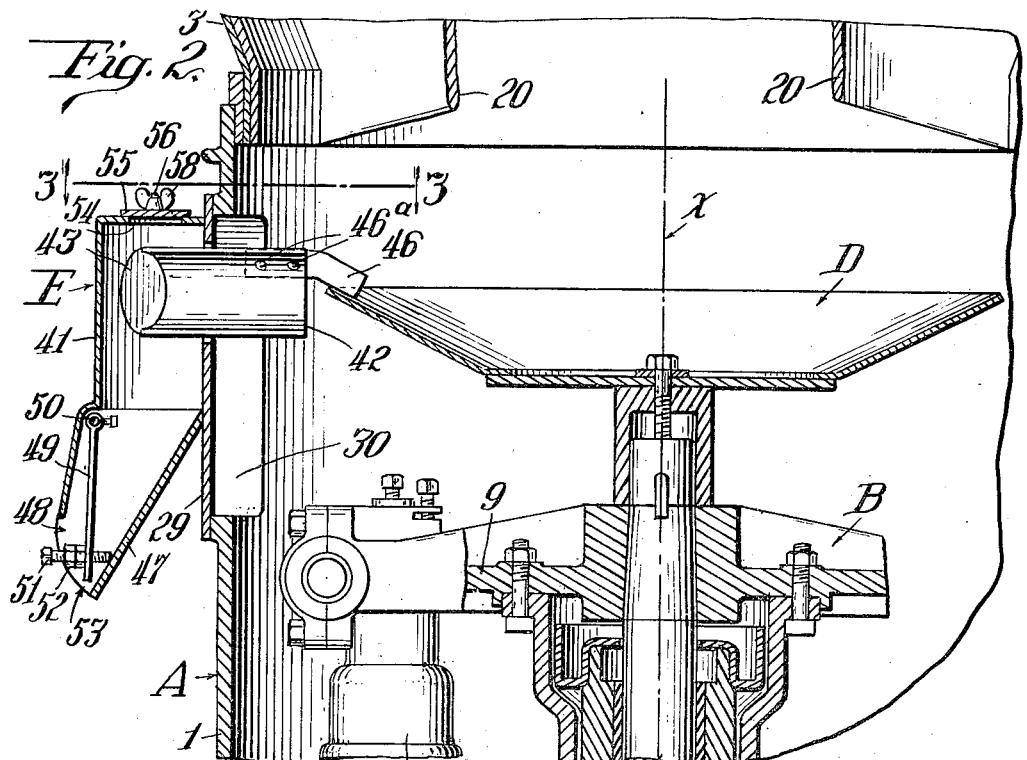
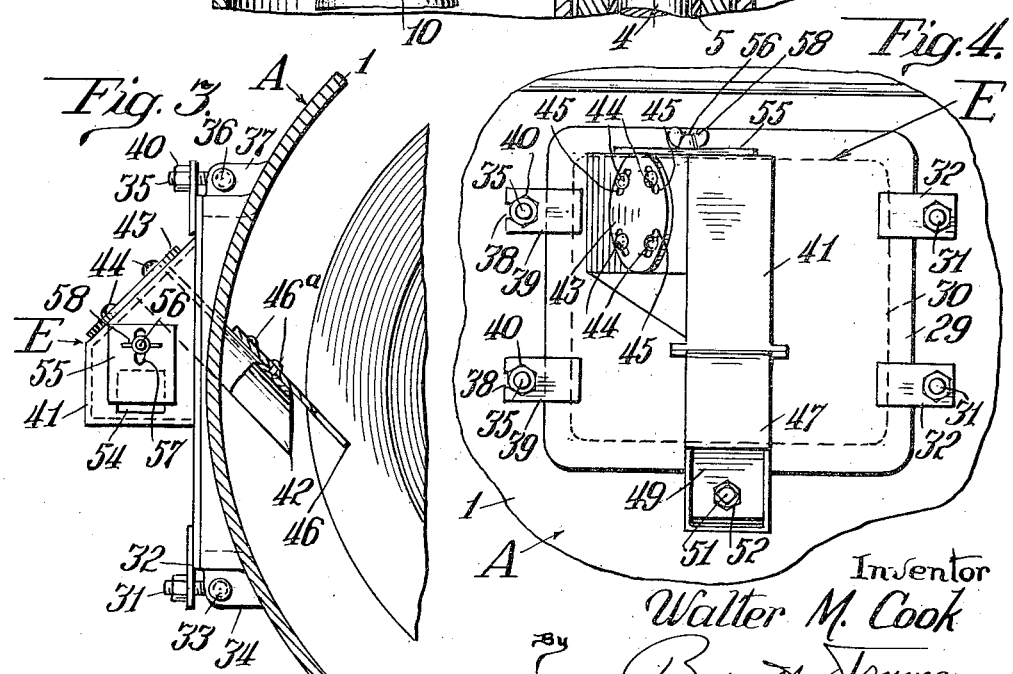

Patented May 14, 1940

2,200,489

UNITED STATES PATENT OFFICE 2,200,489

GRINDING AND SEPARATING APPARATUS

Walter M. Cook, Mount Dora, Fla., assignor to Combustion Engineering Company, Inc., New York, N. Y., a corporation of Delaware Application June 14, 1937, Serial No. 148,139

14 Claims. (Cl. 83—45)

This invention relates to certain new and useful improvements in a grinding and separating apparatus, and more particularly to improved means for removing from the apparatus, at an intermediate stage of the process, certain undesired materials.

In an apparatus of the type to which these improvements are applied, the material is ground or pulverized by means of a plurality of rollers or similar devices in the lower portion of the apparatus, and the ground material is lifted out in an air stream passing upwardly through the mill housing. Before leaving the apparatus, the air stream passes through a separator which rejects insufficiently pulverized or undesirably coarse or heavy material, only material of proper fineness passing the separator and being carried out in the air stream from which this fine material is eventually deposited. The material rejected by the separator settles downwardly through the housing and would substantially all be returned to the grinding process were it not for the mechanism which forms the particular subject matter of this invention. A rotary deflector member is positioned centrally within the mill housing or casing intermediate the grinding and separating mechanism, and the greater portion of the material rejected by the separator settles onto this deflector, from which it is eventually thrown outwardly by centrifugal force. This rejected material contains a considerable quantity of finely divided material that should pass the separator, and this fine material is caught up by the air stream and returned to the separator instead of going back to the grinding process. This increases the efficiency of the separator by increasing the saturation of material in the air stream adjacent the separator or classifier, and also increases the efficiency of the mill or grinding apparatus since this already sufficiently ground material is not returned to the grinding process.

The heavier rejected material thrown from the deflector eventually settles back into the grinding mechanism for further treatment. Certain types of material contain undesired harder substances that it would be desirable to remove completely from the grinding and separating process. For example, some clays carry as much as one per cent or two per cent of sand. This sand is more difficult to grind than clay and the greater portion of the sand will be rejected by the separator and returned to the grinding process. As a result the percentage of sand in the apparatus will rapidly build up, thus decreasing the efficiency of the apparatus. In order to prevent this sand from getting out in the finished product, it is necessary to run the separator at a very high speed.

According to the present invention, means is provided for removing this sand from the apparatus as it settles onto the intermediate deflector so that the sand does not return to the grinding mechanism. More specifically, a throwout pocket is provided in one side of the casing and a scoop or scraper directs the sand from the deflector into this pocket, from which it is discharged outside of the mill housing. An inwardly directed air stream passing through the throwout pocket carries back into the casing the finely divided desirable material that is unavoidably carried out along with the sand.

The principal object of this invention is to provide an improved apparatus of the type briefly described hereinabove and disclosed more in detail in the specifications which follow.

Another object is to provide improved apparatus for removing sand or similar undesired materials from a grinding and separating process.

Another object is to provide, in combination with a roller mill and whizzer separator, mechanism for removing undesired materials rejected by the separator before these materials can return to the mill.

Other objects and advantages of this invention will be more apparent from the following detailed description of one approved form of apparatus constructed and operating according to the principles of this invention.

In the accompanying drawings:

Fig. 2 is an enlarged section similar to the central portion of Fig. 1, but on a larger scale, showing the sand-withdrawing mechanism in vertical section.

Fig. 3 is a partial horizontal section taken substantially on the line 3—3 of Fig. 2.

Fig. 4 is a detail elevation looking from the left at Fig. 2.

Figure 1:
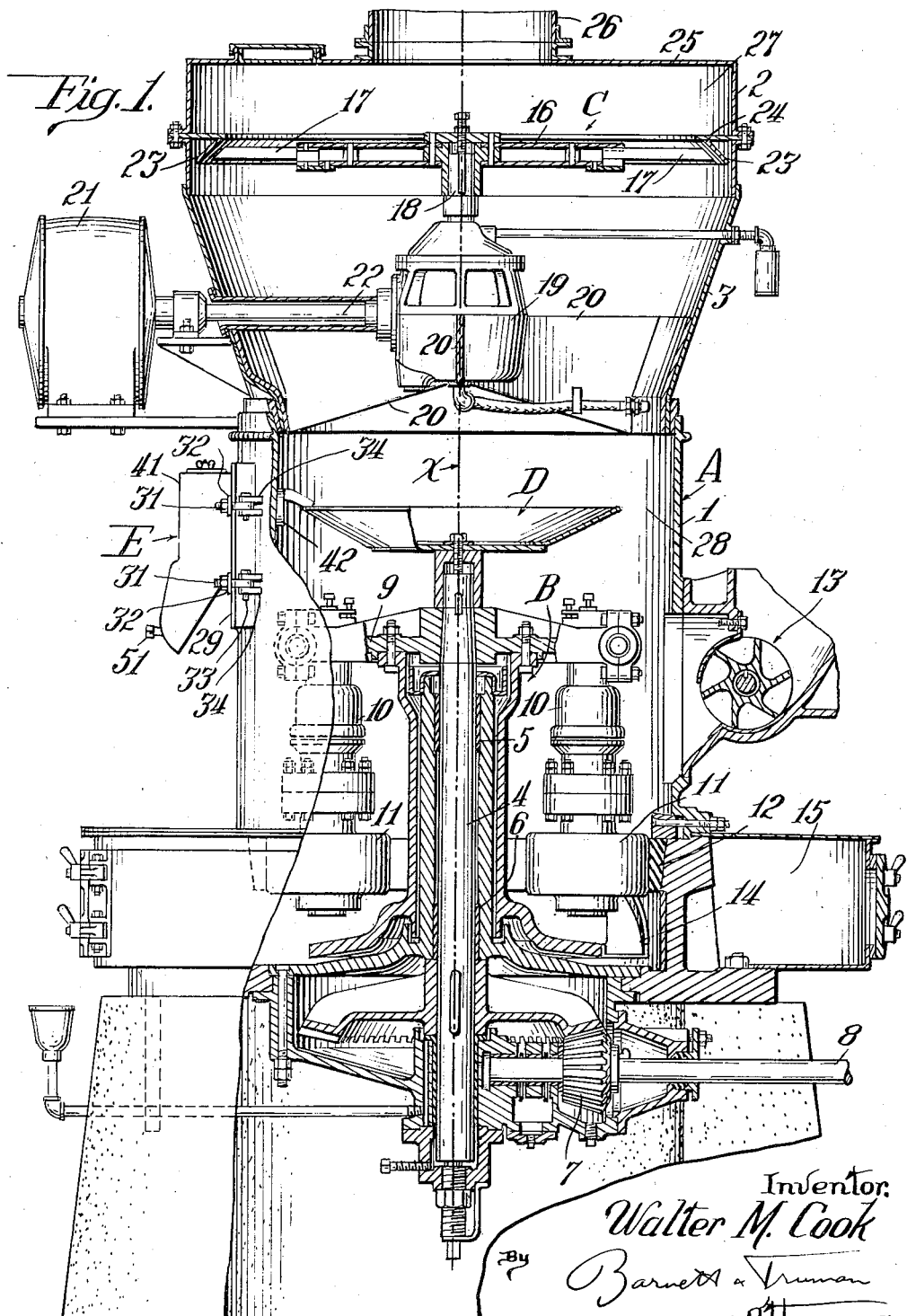
Fig. 1 is a central vertical section through the combined grinding and separating apparatus.

The apparatus comprises generally the upright, substantially closed casing A in the lower portion of which is positioned the grinding mechanism B, and in the upper portion of which is positioned the separating mechanism C. Intermediate the mill B and separator C is positioned the rotary deflector D on which the material rejected by separator C collects, and at E is indicated the mechanism for removing the undesired materials which collect on deflector D.

The enclosing housing or casing A, which is preferably centered about the central vertical axis $x$, comprises a lower cylindrical portion 1, an upper cylindrical portion 2 of larger diameter, and an intermediate upwardly expanding conical portion 3.

The mill B is here shown as of the well known roller type and comprises the central vertical shaft 4 journaled in bearings 5 and 6 and rotated through bevel gearing 7 from the drive shaft 8. The spider 9 carried at the upper end of shaft 4 supports a circular series of roller-carriers 10, each pivoted in the spider so that the grinding rollers 11 supported by the carriers 10 may swing radially outward from the central axis $x$ under the influence of centrifugal force as the spider is rotated. The rollers 11 are freely rotatable about their own axes, and as they swing outwardly will engage the stationary bull-ring 12 and roll thereon. The material to be ground is delivered into the mill housing by any suitable means such as the pocketed feeder shown at 13, this material falling downwardly between the grinding rollers 11 and bull ring 12 so as to be crushed or pulverized therebetween. The plows 14, also carried by the rotating assembly, pick up material that falls into the bottom of the casing and deliver it back between the grinding elements. An air stream enters the lower portion of the casing from the air manifold 15 and flows upwardly through casing A carrying in suspension the material pulverized by the mill.

The separator C is preferably of the general type disclosed and claimed in the patent to Cook #1,783,357, granted December 2, 1930. The central rotary element of this separator is journaled for rotation about the central axis $x$ and comprises a central disc or deflector 16 from which project a circular series of radially extending vanes 17, these vanes being positioned vertically so as to present a minimum of obstruction to the upwardly flowing air stream. This rotary deflector or "whizzer" is carried by vertical shaft 18 journaled in gear casing 19 supported from the outer casing 3 by a plurality of radially extending plates 20. The whizzer is rotated by any suitable means, preferably a motor 21 operatively connected with shaft 18 through horizontal shaft 22 and suitable gearing in the casing 19. The outer ends of vanes 17 are beveled inwardly and upwardly and rotate in close proximity to the lower surface of the downwardly and outwardly projecting annular conical deflector 23 carried by the inner surface of casing 2. The supporting means comprises an annular plate 24 which projects over the upper outer end portions of vanes 17. The upper end of outer casing 2 is closed by a cover plate 25 from the central portion of which the outlet conduit 26 leads upwardly. The air stream through the apparatus is preferably created by an exhaust fan or blower which draws air upwardly and outwardly through this conduit 26.

It will be noted that the only path for this air stream through separator C is through the annular space between the central disc or deflector 16 and the outer stationary annular deflector 23, and between the rapidly rotating vanes 17 which cut across this annular space. Only the very finely divided particles of material held in suspension in the air stream will find their way upwardly between these vanes. The greater portion of the material above a certain size will be thrown outwardly against the stationary deflector 23 and thence directed downwardly through casing A. There is also a classifying zone 27 above the rotary whizzer in which a further separation process takes place. The air in this zone is whirling rapidly due to the motion imparted thereto by the rotating whizzer, and the heavier particles of the materials that have passed the whizzer will be thrown by centrifugal force to the outer portion of this zone and settle down on the annular shelf 24. This material will eventually drop back between the rotating vanes 17 and settle downwardly, together with the other rejected material, through casing A. Only the very finely divided material will eventually be carried out in suspension in the air stream through conduit 26. The fineness of this delivered material will depend, within certain limits, on the speed of rotation of the rotary whizzer, and consequently a variable speed driving means is preferred.

The centrally positioned deflector and collection device D is preferably supported for rotation on the upper end of mill shaft 4. This deflector is preferably dished upwardly or saucer-shape, and its outer peripheral edge is spaced from the adjacent inner wall of casing A so as to provide an annular space 28 through which the upwardly flowing air stream is forced to pass. This upwardly flowing air stream with its suspended material is rotating or whirling, due to the motion imparted thereto by mill B and deflector D and will tend to follow the inner wall of casing A as it moves upwardly toward separator C. As a consequence the material rejected by separator C tends to settle downwardly through the central quieter portion of the enclosure which is less agitated and where the upward air velocity is the lowest. This material will for the most part be collected on or in the deflector D. This material rejected by separator C will unavoidably contain a considerable amount of already sufficiently pulverized material which can eventually pass through the separator without further grinding. As the material collected on deflector D is thrown outwardly by centrifugal force, this finer material will be caught up by the air stream flowing upwardly through passage 28 and will eventually pass through separator C and be carried out by the air stream. This material returned from the deflector D increases the saturation of the air stream at the separator, and consequently increases the efficiency of the separator. Also by preventing the return of this already sufficiently pulverized material to mill B, the capacity of the mill for handling new material is increased. The larger and heavier material will be thrown out more horizontally from deflector D against the outer casing A, and all of this material would eventually find its way back into the mill for further grinding treatment were it not for the withdrawing apparatus E hereinafter disclosed. The assembly as thus far described is substantially the same as that already disclosed and claimed in the copending application of Joe Crites, Serial No. 121,182, filed January 18, 1937, which became Patent No. 2,152,876 on April 4, 1939.

As already noted, there are some materials to be pulverized in this apparatus that contain a certain percentage of harder substance that would desirably be discarded. For example, certain clays contain a small percentage of sand. This sand will be separated out or reduced by the mill to such an extent that it is carried up in the air stream, but this sand will be too coarse to pass through separator C and will settle onto the collector D. The present invention comprehends the removal of this sand from the apparatus at this stage of the process, so that the sand will not be returned to the mill for further treatment. The invention covers broadly any means for removing this sand from the collector D and one approved apparatus for performing this function will now be disclosed in detail. A supporting plate 29 is removably secured over an opening 30 in the side wall of casing A. In the example here shown, a pair of bolts 31 secured in ears 32 projecting from one side of plate 29 are pivotally mounted at 33 in ears 34 formed on the casing A. A similar pair of bolts 35 pivoted at 36 in ears 37 on the casing engage in slots 38 formed in ears 39 projecting from the opposite side of plate 29. By loosening the nuts 40 on bolts 35 the bolts 35 may be swung out of slots 38, after which the plate or door 29 can be swung away from the casing about the hinge-axis 33. This will permit access to the interior of the casing. The throw-out pocket 41, in the form of a substantially closed casing, is mounted on the outside of plate 29. A substantially semi-cylindrical scoop 42 is secured at its outer end to a plate 43 mounted for rotary adjustment by means of bolts 44 secured in one side wall of casing 41 and projecting through slots 45 in plate 43. This adjustment permits the scoop to be rotated around the central longitudinal axis of the cylinder so as to be presented at the most desirable angle to the air stream within the casing A. This scoop 42 projects inwardly through a suitable opening in supporting plate 29 so that the inner end of the scoop is positioned adjacent the peripheral edge of rotary deflector or collector D. Preferably the scoop projects inwardly at an angle opposed to the direction of rotation of the whirling materials within the casing. A scraper 46 may be secured at 46a to the inner end of scoop 42, this scraper projecting inwardly over the outer upper surface of deflector D in position to scrape or dislodge materials therefrom.

The lower portion of casing 41 of the throw-out pocket is in the form of a chute 47 having a discharge opening 48. A closure or valve 49 is pivotally suspended at its upper end 50 within spout 47 so as to swing toward closed position under the influence of gravity, but this valve may swing open to permit the discharge of material collected in the pocket 41. A bolt 51 adjustably threaded in the lower portion of door or valve 49 and provided with a lock nut 52 forms an adjustable stop to limit the closing movement of valve 49 so that there will be a small permanent opening 53 at the lower end of the spout to admit a restricted inflow of air. An opening 54 in the top of casing 41 is partially closed by cover plate 55 held in place by bolt 56 projecting through slot 57 in plate 55 and provided with the holding-nut 58. This provides an additional air inlet opening which may be adjusted in size by properly positioning the closure plate 55.

In operation, the sand or other heavy material collected on member D will be thrown outwardly in a substantially horizontal plane and will whirl in the casing A for a sufficient length of time to be caught by scoop 42 and directed outwardly into the throw-out pocket 41. The scraper 46 will assist in dislodging this material from the outer portion of collector D. The sand will gravitate out through discharge chute 47. The restricted inflow of air through openings 53 and 54, caused by the suction within the main casing A, will carry back into the mill housing the greater portion of the clay or other lighter materials that may unavoidably be carried out by the scoop along with the sand. In this manner the greater portion of the sand or other undesired hard material is withdrawn at an intermediate stage of the grinding and separating process, with a minimum loss of the lighter materials that it is desired to pulverize and carry out in the air stream.

As a result of removing this sand or other undesired heavy material, the efficiency of both the mill and the separator is improved. The capacity of the mill is increased since it is able to handle additional new material instead of the sand that would otherwise be returned for further grinding. The separator can be operated at a slower speed and thereby increase its output of properly pulverized material. With finely divided sand in the system it is necessary to operate the whizzer at high speed in order to hold back this sand and this consequently decreases the amount of properly pulverized clay that would otherwise pass the separator if the speed were lower. The quality of the finished product is also improved since the amount of sand therein is reduced to a minimum.

It will be understood that while I have considered clay and sand as an example of the materials to be separated, this apparatus is equally adapted for handling any mixture of materials in which one material is appreciably harder to grind than the other. The soft material always tends to be pulverized or be reduced to a powder more readily, and the hard material tends to accumulate in the grinding and separating system.

It will also be understood that the improvements herein disclosed are not necessarily limited for use with the particular form of mill and separator herein disclosed. Other forms of mill or grinding mechanism, and a different type of separator, could be substituted without affecting the general principles of operation of these improvements.

I claim:

1. A grinding and separating apparatus comprising an upright casing substantially centered about a vertical axis, grinding mechanism in the lower portion of the casing, a separator in the upper portion of the casing, means for feeding material to be ground to the grinding mechanism, an inlet for the admission of an air stream to the lower portion of the casing, an outlet in the upper portion of the casing for the discharge of the air stream with suspended finely pulverized material, an impervious deflector member centered and supported for rotation about the central vertical axis so that the flow of air and materials through the casing is confined to an annular space between the perimeter of this deflector and the surrounding casing wall, said deflector serving to collect thereon material rejected downwardly by the separator and to throw off and return finer portions of this material into the upwardly flowing air stream, and means fixedly supported by the casing and comprising a portion projecting inwardly adjacent the rotating deflector for withdrawing laterally from the casing and discharging at a location remote from the grinding mechanism heavier material that settles out upon the deflector.

2. A grinding and separating apparatus comprising an upright casing substantially centered about a vertical axis, grinding mechanism in the lower portion of the casing, a separator in the upper portion of the casing, means for feeding material to be ground to the grinding mechanism, an inlet for the admisison of an air stream to the lower portion of the casing, an outlet in the upper portion of the casing for the discharge of the air stream with suspended finely pulverized material, an impervious deflector member centered and supported for rotation about the central vertical axis so that the flow of air and materials through the casing is confined to an annular space between the perimeter of this deflector and the surrounding casing wall, a throw-out pocket through the casing wall substantially in horizontal alignment with the periphery of the rotary deflector, and a scoop positioned in the annular space to intercept heavier material thrown from the deflector and direct this material into the pocket.

3. A grinding and separating apparatus comprising an upright casing substantially centered about a vertical axis, grinding mechanism in the lower portion of the casing, a separator in the upper portion of the casing, means for feeding material to be ground to the grinding mechanism, an inlet for the admission of an air stream to the lower portion of the casing, an outlet in the upper portion of the casing for the discharge of the air stream with suspended finely pulverized material, an impervious deflector member centered and supported for rotation about the central vertical axis so that the flow of air and materials through the casing is confined to an annular space between the perimeter of this deflector and the surrounding casing wall, a throw-out pocket opening through the casing wall substantially in horizontal alignment with the periphery of the rotary deflector, a scoop positioned in the annular space to intercept heavier material thrown from the deflector and direct this material into the pocket and a scraper carried by the inner end portion of the scoop for dislodging material from the upper surface of the deflector.

4. A grinding and separating apparatus comprising an upright casing substantially centered about a vertical axis, grinding mechanism in the lower portion of the casing, a separator in the upper portion of the casing, means for feeding material to be ground to the grinding mechanism, an inlet for the admission of an air stream to the lower portion of the casing, an outlet in the upper portion of the casing for the discharge of the air stream with suspended finely pulverized material, an upwardly dished impervious deflector member centered and supported for rotation about the central vertical axis so that the flow of air and materials through the casing is confined to an annular space between the perimeter of this deflector and the surrounding casing wall, said deflector serving to collect thereon material rejected downwardly by the separator and to throw off and return finer portions of this material into the upwardly flowing air stream, and means fixedly supported by the casing and comprising a portion projecting inwardly adjacent the deflector to withdraw laterally from the casing heavier material collected on the upper surface of the deflector without permitting this material to return within the casing to the grinding mechanism.

5. A grinding and separating apparatus comprising an upright casing substantially centered about a vertical axis, grinding mechanism in the lower portion of the casing, a separator in the upper portion of the casing, means for feeding material to be ground to the grinding mechanism, an inlet for the admission of an air stream to the lower portion of the casing, an outlet in the upper portion of the casing for the discharge of the air stream with suspended finely pulverized material, an upwardly dished impervious deflector member centered and supported for rotation about the central vertical axis so that the flow of air and materials through the casing is confined to an annular space between the perimeter of this deflector and the surrounding casing wall, a throw-out pocket opening through the casing wall substantially in horizontal alignment with the periphery of the rotary deflector, and a scoop positioned in the annular space to intercept heavier material thrown from the deflector and direct this material into the pocket.

6. A grinding and separating apparatus comprising an upright casing substantially centered about a vertical axis, grinding mechanism in the lower portion of the casing, a separator in the upper portion of the casing, means for feeding material to the grinding mechanism, an inlet for the admission of an air stream to the lower portion of the casing, an outlet in the upper portion of the casing for the discharge of the air stream with suspended finely pulverized material, an impervious deflector member centered and supported for rotation about the central vertical axis between the grinding and separating mechanisms so that the flow of air and materials is confined to an annular space between the perimeter of this deflector and the surrounding casing wall, a throw-out pocket opening through the casing wall substantially in horizontal alignment with the periphery of the deflector, a scoop positioned in the annular space to intercept and collect material thrown from the upper surface of the deflector and direct this materal into the pocket and means for permitting a restricted inflow of air through the pocket to carry back into the casing lighter portions of the withdrawn material.

7. A grinding and separating apparatus comprising an upright casing substantially centered about a vertical axis, grinding mechanism in the lower portion of the casing, a separator in the upper portion of the casing, means for feeding material to the grinding mechanism, an inlet for the admission of an air stream to the lower portion of the casing, an outlet in the upper portion of the casing for the discharge of the air stream with suspended finely pulverized material, an impervious deflector member centered and supported for rotation about the central vertical axis between the grinding and separating mechanisms so that the flow of air and materials is confined to an annular space between the perimeter of this deflector and the surrounding casing wall, a throw-out pocket opening through the casing wall substantially in horizontal alignment with the periphery of the deflector, a scoop positioned in the annular space to intercept and collect material thrown from the upper surface of the deflector and direct this material into the pocket and valve means for permitting the gravity discharge outside the casing of heavier material from the pocket and also permitting a restricted inflow of air to carry portions of the material back into the casing.

8. A grinding and separating apparatus comprising an upright casing substantially centered about a vertical axis, grinding mechanism in the lower portion of the casing, a separator in the upper portion of the casing, means for feeding material to the grinding mechanism, an inlet for the admission of an air stream to the lower portion of the casing, an outlet in the upper portion of the casing for the discharge of the air stream with suspended finely pulverized material, an impervious deflector member centered and supported for rotation about the central vertical axis between the grinding and separating mechanisms so that the flow of air and materials is confined to an annular space between the perimeter of this deflector and the surrounding casing wall, a throw-out pocket opening through the casing wall substantially in horizontal alignment with the periphery of the deflector, a scoop positioned in the annular space to intercept and collect material thrown from the upper surface of the deflector and direct this material into the pocket, a scraper carried by the inner end portion of the scoop for dislodging material from the upper surface of the deflector, and means for permitting a restricted inflow of air through the pocket to carry back into the casing lighter portions of the withdrawn material.

9. A grinding and separating apparatus comprising an upright casing substantially centered about a central vertical axis, a grinding mechanism in the lower portion of the casing comprising a grinding assembly rotatable about the central axis, a separating mechanism in the upper portion of the casing comprising cooperating rotary and stationary deflectors and means for driving the rotary deflector, means for feeding material to be ground to the grinding mechanism, an inlet for the admission of an air stream to the lower portion of the casing, an outlet in the upper portion of the casing for the discharge of the air stream with suspended finely pulverized material, an upwardly dished impervious deflector member centered on and supported by the rotatable grinding assembly for rotation about the central axis in the space intermediate the grinding and separating mechanisms so that the flow of air and materials through the casing is confined to the annular space between the perimeter of this deflector and the surrounding casing wall, and means for withdrawing laterally from the casing and discharging at a location remote from the grinding mechanism heavier material rejected by the separator and collected on the dished deflector.

10. A grinding and separating apparatus comprising an upright casing substantially centered about a central vertical axis, a grinding mechanism in the lower portion of the casing comprising a grinding assembly rotatable about the central axis, a separating mechanism in the upper portion of the casing comprising cooperating rotary and stationary deflectors and means for driving the rotary deflector, means for feeding material to be ground to the grinding mechanism, an inlet for the admission of an air stream to the lower portion of the casing, an outlet in the upper portion of the casing for the discharge of the air stream with suspended finely pulverized material, an upwardly dished impervious deflector member centered on and supported by the rotatable grinding assembly for rotation about the central axis in the space intermediate the grinding and separating mechanisms so that the flow of air and materials through the casing is confined to the annular space between the perimeter of this deflector and the surrounding casing wall, said dished deflector serving to collect thereon material rejected downwardly by the separator and to return finer portions of this material back into the upwardly flowing air stream, means for withdrawing laterally from the casing and discharging at a location remote from the grinding mechanism heavier material collected on the deflector.

11. A grinding and separating apparatus comprising an upright casing substantially centered about a central vertical axis, a grinding mechanism in the lower portion of the casing comprising a grinding assembly rotatable about the central axis, a separating mechanism in the upper portion of the casing comprising cooperating rotary and stationary deflectors and means for driving the rotary deflector, means for feeding material to be ground to the grinding mechanism, an inlet for the admission of an air stream to the lower portion of the casing, an outlet in the upper portion of the casing for the discharge of the air stream with suspended finely pulverized material, an upwardly dished impervious deflector member centered on and supported by the rotatable grinding assembly for rotation about the central axis in the space intermediate the grinding and separating mechanisms so that the flow of air and materials through the casing is confined to the annular space between the perimeter of this deflector and the surrounding casing wall, a throw-out pocket opening through the casing wall substantially in horizontal alignment with the periphery of the deflector, and a scoop positioned in the annular space to intercept heavier material thrown from the deflector and direct this material into the pocket.

12. A grinding and separating apparatus comprising an upright casing substantially centered about a central vertical axis, a grinding mechanism in the lower portion of the casing comprising a grinding assembly rotatable about the central axis, a separating mechanism in the upper portion of the casing comprising cooperating rotary and stationary deflectors and means for driving the rotary deflector, means for feeding material to be ground to the grinding mechanism, an inlet for the admission of an air stream to the lower portion of the casing, an outlet in the upper portion of the casing for the discharge of the air stream with suspended finely pulverized material, an upwardly dished impervious deflector member centered on and supported by the rotatable grinding assembly for rotation about the central axis in the space intermediate the grinding and separating mechanisms so that the flow of air and materials through the casing is confined to the annular space between the perimeter of this deflector and the surrounding casing wall, a throw-out pocket opening through the casing wall substantially in horizontal alignment with the periphery of the deflector, a scoop positioned in the annular space to intercept heavier material thrown from the deflector and direct this material into the pocket, and a scraper carried by the inner end portion of the scoop for dislodging material from the upper surface of the deflector.

13. A grinding and separating apparatus comprising an upright casing substantially centered about a central vertical axis, a grinding mechanism in the lower portion of the casing comprising a grinding assembly rotatable about the central axis, a separating mechanism in the upper portion of the casing comprising cooperating rotary and stationary deflectors and means for driving the rotary deflector, means for feeding material to be ground to the grinding mechanism, an inlet for the admission of an air stream to the lower portion of the casing, an outlet in the upper portion of the casing for the discharge of the air stream with suspended finely pulverized material, an upwardly dished impervious deflector member centered on and supported by the rotatable grinding assembly for rotation about the central axis in the space intermediate the grinding and separating mechanisms so that the flow of air and materials through the casing is confined to the annular space between the perimeter of this deflector and the surrounding casing wall, a throw-out pocket opening through the casing wall substantially in horizontal alignment with the periphery of the deflector, a scoop positioned in the annular space to intercept heavier material thrown from the deflector and direct this material into the pocket and means for discharging the heavier porton of the material from the pocket outside the casing and permitting a restricted inflow of air to carry the lighter portion of the material back into the casing.

14. A grinding and separating apparatus comprising an upright casing substantially centered about a central vertical axis, a grinding mechanism in the lower portion of the casing comprising a grinding assembly rotatable about the central axis, a separating mechanism in the upper portion of the casing comprising cooperating rotary and stationary deflectors and means for driving the rotary deflector, means for feeding material to be ground to the grinding mechanism, an inlet for the admission of an air stream to the lower portion of the casing, an outlet in the upper portion of the casing for the discharge of the air stream with suspended finely pulverized material, an upwardly dished impervious deflector member centered on and supported by the rotatable grinding assembly for rotation about the central axis in the space intermediate the grinding and separating mechanisms so that the flow of air and materials through the casing is confined to the annular space between the perimeter of this deflector and the surrounding casing wall, a throw-out pocket opening through the casing wall substantially in horizontal alignment with the periphery of the deflector, a scoop positioned in the annular space to intercept heavier material thrown from the deflector and direct this material into the pocket, a scraper carried by the inner end portion of the scoop for dislodging material from the upper surface of the deflector, and means for discharging the heavier portion of the material from the pocket outside the casing and permitting a restricted inflow of air to carry the lighter portion of the material back into the casing.

WALTER M. COOK.

CERTIFICATE OF CORRECTION.

Patent No. 2,200,489. May 14, 1940.

WALTER M. COOK.

It is hereby certified that error appears in the printed specification of the above numbered patent requiring correction as follows: Page 4, first column, line 14, claim 2, after "pocket" insert --opening--; page 5, second column, line 4, claim 10, before "means" insert --and--; and that the said Letters Patent should be read with this correction therein that the same may conform to the record of the case in the Patent Office.

Signed and sealed this 25th day of June, A. D. 1940.

(Seal)

Henry Van Arsdale,
Acting Commissioner of Patents.